O. Collier: Pistons & Piston Packing.

4350

REISSUED APR. 25 1871

WITNESSES:
P. C. Dieterich.
Wm. H. C. Smith.

INVENTOR.
O. Collier.
per: Munn & Co
ATTORNEYS.

United States Patent Office.

ORRIN COLLIER, OF SACRAMENTO, CALIFORNIA.

Letters Patent No. 98,232, dated December 28, 1869; reissue No. 4,350, dated April 25, 1871.

IMPROVEMENT IN PISTON-PACKINGS.

The Schedule referred to in these Letters Patent and making part of the same.

*To all whom it may concern:*

Be it known that I, ORRIN COLLIER, of Sacramento, in the county of Sacramento and State of California, have invented a new and useful Improvement in Pistons and Piston-Packing; and I do hereby declare that the following is a full, clear, and exact description thereof, which will enable others skilled in the art to make and use the same, reference being had to the accompanying drawing forming part of this specification.

This invention relates to improvements in pistons for steam-engines, pumps, &c., and mode of packing the same, having for its object to provide a simple, cheap, and more efficient arrangement of parts than those now in use; and, The invention consists in a piston provided with a central annular groove and adjustable centering ring, with end disks and other annular grooves or recesses for packing-rings, as more particularly described hereafter.

In the accompanying drawing—

Similar letters of reference indicate corresponding parts.

Figure 1:
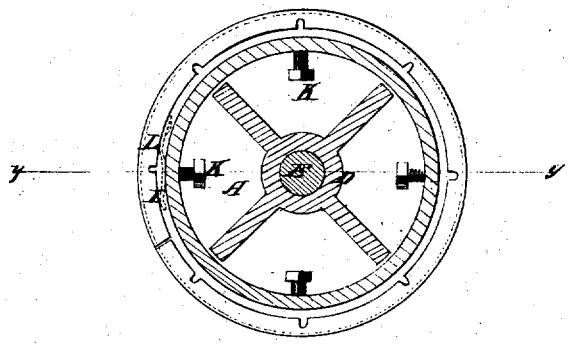
Figure 1 represents a horizontal section of my improved piston taken on the line *x x* of fig. 2.
Figure 2:
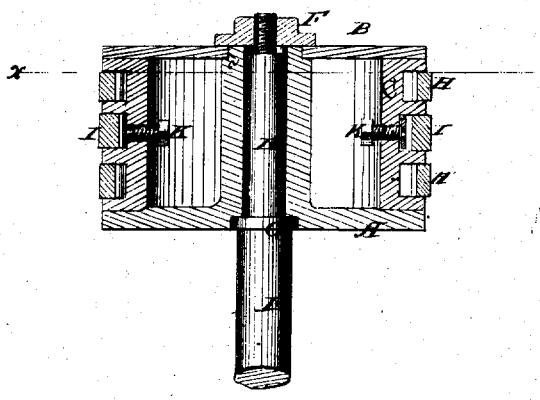
Figure 2 represents a cross-section of fig. 1 taken on the line *y y*.

The piston comprises two disks, or a piston-head and follower, A and B, and a grooved ring, C.

The disk A is provided with a central tubular extension, D, which receives the disk B at the end against the shoulder *a*.

It also receives internally the piston-rod E, which projects sufficiently beyond the end of the piston to receive the nut F for clamping the two disks together with the grooved ring C between them, which secures the whole on the piston-rod against the collar G.

The ring C has a central groove or recess in which is placed the ring I, either sprung in or made in sections, which serves as a packing-ring, but which is more especially designed for centering the piston in the cylinder by the use of the set-screws K, which work through the ring C. These set-screws may act directly against the ring, or springs L may be interposed.

H H are packing-rings. The grooves for these rings may be formed entirely in the ring C, or the disks A B may complete the grooves when the ends of the ring C have been rebated.

The rings themselves, instead of being made an entirely square rectangle in cross-section, as represented, may be grooved or beveled, or made in any form, and each in one or more parts, as may be desired. These packing-rings may be expanded by the pressure of the steam, or made so elastic as to tightly fill the cylinder and confine the steam.

The center ring I is a simple and most efficient means of centering the piston in the cylinder and preventing unequal wear on the piston.

Having thus described my invention,

I claim as new and desire to secure by Letters Patent—

1. The ring C, grooved on its periphery, combined with an expansible centering-ring I, working in said groove, for the purpose specified.

2. The combination of the centering-ring I, packing-rings H H, disks A B, and groove ring C, substantially as and for the purposes described.

ORRIN COLLIER.

Witnesses:

GEO. W. MABEE,

ALEX. F. ROBERTS.